United States Patent
High et al.

(10) Patent No.: US 10,218,754 B2
(45) Date of Patent: Feb. 26, 2019

(54) SYSTEMS AND METHODS FOR MANAGEMENT OF DIGITALLY EMULATED SHADOW RESOURCES

(71) Applicant: Walmart Apollo, LLC, Bentonville, AR (US)

(72) Inventors: Donald High, Noel, MO (US); Michael Atchley, Springdale, AR (US); John Paul Thompson, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 278 days.

(21) Appl. No.: 14/808,585

(22) Filed: Jul. 24, 2015

(65) Prior Publication Data
US 2016/0036875 A1 Feb. 4, 2016

Related U.S. Application Data

(60) Provisional application No. 62/030,710, filed on Jul. 30, 2014.

(51) Int. Cl.
*H04L 29/06* (2006.01)
*H04L 29/08* (2006.01)

(52) U.S. Cl.
CPC .......... *H04L 65/4038* (2013.01); *H04L 67/16* (2013.01); *H04L 67/32* (2013.01); *H04L 67/02* (2013.01)

(58) Field of Classification Search
CPC . H04L 65/4038; H04L 41/5054; H04L 67/02; H04L 67/16; H04L 67/32
See application file for complete search history.

(56) References Cited

U.S. PATENT DOCUMENTS 7,272,615 B2 * 9/2007 Li ..................... G06F 17/30607
707/781
7,765,478 B2 7/2010 Reed et al.
(Continued)

FOREIGN PATENT DOCUMENTS

EP 0698328 B1 2/1996
EP 1306735 A1 5/2003
(Continued)

OTHER PUBLICATIONS

AT&T Connect Integrated Edition v10 Client for PC Product Brief, dated Sep. 5, 2014, 2 pages.
(Continued)

*Primary Examiner* — Brian J. Gillis
*Assistant Examiner* — Chhian (Amy) Ling
(74) *Attorney, Agent, or Firm* — McCarter & English, LLP; David R. Burns

(57) ABSTRACT

Various aspects and embodiments facilitate management of digitally emulated physical resources. Users can access a management system to create pairings between digitally emulated resources and physical resources. The paired resources can be consistently managed through the system, such that any user from any source can access and dynamically reserve physical and digital resources. In further embodiments, the system can create pairings between the digital emulation and physical resources based on merge operations performed on multiple digital emulations of resources, copy and pasting for other digital emulation of resources, and digital altering of existing resources. The system enables efficient management, control, and implements security for digital and physical resources using, for example, a "digital room." Security rules and enforcement can be specified within the digital rooms based on access (Continued)

rights, content displays, and can be specific to each resource controlled by the digital room.

16 Claims, 6 Drawing Sheets

(56) References Cited

U.S. PATENT DOCUMENTS

| | | |
|---|---|---|
| 7,810,069 B2 | 10/2010 | Charisius et al. |
| 8,064,487 B1 | 11/2011 | Armstrong et al. |
| 8,195,497 B2 | 6/2012 | Montgomery |
| 8,275,197 B2 | 9/2012 | Hawkins et al. |
| 8,307,299 B2 | 11/2012 | Conner |
| 8,341,004 B2 | 12/2012 | Daughtrey et al. |
| 8,375,421 B1 | 2/2013 | Shigapov et al. |
| 8,402,091 B2 | 3/2013 | Karniely |
| 8,448,221 B2 | 5/2013 | Pearcy et al. |
| 8,593,994 B2 * | 11/2013 | Swanson ............ G06Q 10/1095 370/260 |
| 8,654,941 B2 | 2/2014 | Mock et al. |
| 8,655,964 B2 | 2/2014 | Munson |
| 8,819,617 B1 | 8/2014 | Koenig et al. |
| 2003/0037109 A1 | 2/2003 | Newman et al. |
| 2003/0182168 A1 | 9/2003 | Lyons |
| 2004/0017400 A1 | 1/2004 | Ly et al. |
| 2007/0112607 A1 | 5/2007 | Tien et al. |
| 2008/0040187 A1 | 2/2008 | Carraher et al. |
| 2009/0119604 A1 * | 5/2009 | Simard ................. G06Q 10/10 715/757 |
| 2009/0234721 A1 | 9/2009 | Bigelow et al. |
| 2010/0228825 A1 | 9/2010 | Hegde et al. |
| 2011/0016375 A1 | 1/2011 | Ramic et al. |
| 2011/0246172 A1 | 10/2011 | Liberman et al. |
| 2011/0271129 A1 * | 11/2011 | Flannagan .......... H04L 12/1822 713/323 |
| 2011/0307800 A1 | 12/2011 | Back et al. |
| 2011/0313803 A1 | 12/2011 | Friend et al. |
| 2012/0116835 A1 | 5/2012 | Pope et al. |
| 2012/0124484 A1 | 5/2012 | Robinson et al. |
| 2012/0150577 A1 | 6/2012 | Berg et al. |
| 2012/0278381 A1 * | 11/2012 | Ferlitsch ............. G06Q 10/109 709/203 |
| 2013/0013778 A1 | 1/2013 | Herde et al. |
| 2013/0060594 A1 | 3/2013 | Motoyama |
| 2013/0111359 A1 | 5/2013 | Silbey et al. |
| 2013/0191891 A1 * | 7/2013 | Adderly ................ H04W 12/06 726/5 |
| 2013/0290841 A1 | 10/2013 | Yamazoe et al. |
| 2014/0006620 A1 * | 1/2014 | Assuncao ......... H04M 1/72569 709/226 |
| 2014/0028784 A1 | 1/2014 | Deyerle et al. |
| 2014/0164930 A1 | 6/2014 | Lieb et al. |
| 2014/0229866 A1 * | 8/2014 | Gottlieb ................ H04L 65/403 715/758 |
| 2014/0359272 A1 * | 12/2014 | Hiltunen .................. G09C 1/00 713/150 |
| 2014/0372906 A1 | 12/2014 | Campbell et al. |

FOREIGN PATENT DOCUMENTS

| | | |
|---|---|---|
| WO | 2005/107263 A2 | 11/2005 |
| WO | 2008/095566 A1 | 8/2008 |

OTHER PUBLICATIONS

Avaya Scopia XT Video Conferencing Product Overview, 5 pages, available at http://www.avaya.com/usa/product/avaya-scorpia-xt-video-conferencing/?view=overview, last accessed Jan. 9, 2015.
Avaya Scopia XT Video Conferencing Product Overview, 6 pages, 2013.
Crestron RL Product Information, 2 pages, available at http://www.crestron.com/products/crestron_rl_presentation_collaboration_conference_room_lync, last accessed Jan. 30, 2015.
Crestron RL Product Information, 3 pages, available at http://www.crestron.com/products/crestron_rl_presentation_collaboration_conference_room_lync, last accessed Jan. 9, 2015.
Eylean Project Management Board Features, 13 pages, available at http://www.eylean.com/Project-management-board-features, last accessed Dec. 17, 2014.
iceScrum Pro Features and Pricing, 4 pages, available at https://www.icescrum.com/pricing/#standalone, last accessed Aug. 6, 2015.
iceScrum Pro product description, 2 pages, available at https://www.kagilum.com/icescrum-pro, last accessed Dec. 17, 2014.
Polycom Conference Control Application Data Sheet, 2 pages, 2014.
Scrumwise Product Features, 5 pages, available at https://www.scrumwise.com/features.html, last accessed Aug. 6, 2015.
SeeNowDo Digital Task Board FAQ, 2 pages, available at https://www.seenowdo.com, last accessed Aug. 6, 2015.
SMART Room System for Microsoft Lync, Product Features, 2 pages, available at http://smarttech.com/Solutions/Business_Solutions/Products/SMART_Room_System, last accessed Jan. 9, 2015.
Storm Board Help, 12 pages, available at https://www.stormboard.com/main/help#stickies, last accessed Aug. 6, 2015.
Trello Product Tour, 10 pages, available at https://www.trello.com/tour, last accessed Aug. 6, 2015.
WebEx Meetings Product Overview, 3 pages, available at http://www.webex.com, last accessed Jan. 9, 2015.

\* cited by examiner

SYSTEMS AND METHODS FOR MANAGEMENT OF DIGITALLY EMULATED SHADOW RESOURCES

CROSS-REFERENCE TO RELATED APPLICATIONS

This application claims priority to and benefit of U.S. Provisional Patent Application No. 62/030,710, filed Jul. 30, 2014, the disclosure of which is incorporated herein by reference in its entirety.

BACKGROUND

A number of conventional systems provide functions for managing and scheduling resources, for example, within corporate settings. Notably, these systems provide for some management capability, but typically fail to synchronize across various groups who may wish to use resources. Further, calendaring systems fail to address situations where resources can be accessed from multiple sources. Other management tools address specific types of resources (e.g., digital versus physical) with little ability to manage across both types or maintain accurate scheduling.

SUMMARY

Accordingly, various aspects and embodiments facilitate management of digitally emulated physical resources. According to one embodiment, users can access a management system to create pairings between digitally emulated resources and physical resources. The paired resources can be consistently managed through the system, such that any user from any source can access and dynamically reserve physical and digital resources. In further embodiments, the system can create pairings between the digital emulation and physical resources based on merge operations performed on multiple digital emulations of resources, copy and pasting for other digital emulation of resources, and digital altering of existing resources. The system enables efficient management, control, and implements security for digital and physical resources using, for example, a "digital room."

The system is configured to enable users to schedule both the resources they need, and to schedule presentations and/or content displays that will take place at the future scheduled meeting. According to another embodiment, the management system can police the content being displayed to ensure that confidentiality and/or security rules are enforced. For example, the management system can be configured to monitor physical properties of the physical rooms being emulated, and further monitor properties associated with the emulated rooms. Security enforcement can be executed if, for example, the door in the physical room is ajar or if a user accesses the digital emulation without appropriate permissions. In some examples, security enforcement can include preventing a presentation or other content from being displayed and/or communicated.

According to one aspect, provided is a system for managing emulations of digital and physical conference resources. The system comprises at least one processor operatively connected to a memory, a creation component, executed by the at least one processor, configured to create a digital room accessible via a communication network, wherein the digital room emulates physical properties of at least one physical meeting room including at least one physical resource within the at least one physical meeting room, a scheduling component, executed by the at least one processor, configured to schedule and to manage invitations for access to the digital and the at least one physical room, a management component, executed by the at least one processor, configured to manage operation of the at least one physical resource, and a security component, executed by the at least one processor, configured to monitor properties associated with the at least one physical room and the digital room for compliance with at least one security rule.

According to one embodiment, the creation component is further configured to modify the digital room to add additional physical resources or additional physical meeting rooms. According to one embodiment, the creation component is further configured to access an inventory of resources associated with the at least one physical meeting room or the additional physical meeting rooms and associate the digital meeting room with physical resources specified in the inventory of resources. According to one embodiment, the creation component is configured to associate the physical resources with the digital meeting room responsive to user selection. According to one embodiment, the scheduling component is further configured to manage scheduling of participants, physical, and digital resources.

According to one embodiment, the scheduling component is further configured to schedule respective ones of the at least one physical resource within the at least one physical meeting room for presenting digital content. According to one embodiment, the management component is further configured to manage operation of the at least one physical resource based at least in part on scheduling of content to be displayed on the respective ones of the at least one physical resource. According to one embodiment, the security component is further configured to analyze the scheduled digital content for access restriction and determine compliance with the access restrictions based, at least in part on the properties.

According to one embodiment, the properties include information on participants present in the digital and the at least one physical room and access permissions associated with the participants. According to one embodiment, the security component is configured to prevent display of the scheduled content responsive to violation of an access restriction. According to one embodiment, the security component is further configured to prevent display of the scheduled content responsive to any one of an open door in an associated meeting room, unauthorized person, or unidentified person having access.

According to another aspect, a computer implemented method for managing emulations of digital and physical conference resources is provided. The method comprises creating, by a computer system, a digital room accessible via a communication network, wherein the digital room emulates physical properties of at least one physical meeting room including at least one physical resource within the at least one physical meeting room, scheduling, by the computer system, invitations for access to the digital and the at least one physical room, managing, by the computer system, operation of the at least one physical resource, and monitoring, by the computer system, properties associated with the at least one physical room and the digital room for compliance with at least one security rule.

According to one embodiment, the method further comprises modifying, by the computer system, the digital room to add additional physical resources or additional physical meeting rooms. According to one embodiment, the method further comprises accessing, by the computer system an inventory of resources associated with the at least one physical meeting room or the additional physical meeting rooms, and associating, by the computer system, the digital meeting room with physical resources specified in the inventory of resources. According to one embodiment, the act of associating the physical resources with the digital meeting room is responsive to user selection of the physical resources. According to one embodiment, scheduling includes managing coordination of participants, physical, and digital resources scheduling. According to one embodiment, scheduling includes scheduling respective ones of the at least one physical resource within the at least one physical meeting room for presenting digital content.

According to one embodiment, the act of managing includes managing operation of the at least one physical resource based at least in part on scheduling of content to be displayed on the respective ones of the at least one physical resource. According to one embodiment, the method further comprises analyzing, by the computer system, the scheduled digital content for access restriction, and determining, by the computer system, compliance with the access restrictions based, at least in part on the properties.

According to one embodiment, the properties include information on participants present in the digital and the at least one physical room and access permissions associated with the participants. According to one embodiment, comprising preventing, by the computer system, display of the scheduled content responsive to violation of an access restriction. According to one embodiment, the method further comprises preventing, by the computer system, display of the scheduled content responsive to any one of an open door in an associated meeting room, unauthorized person, or unidentified person having access.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
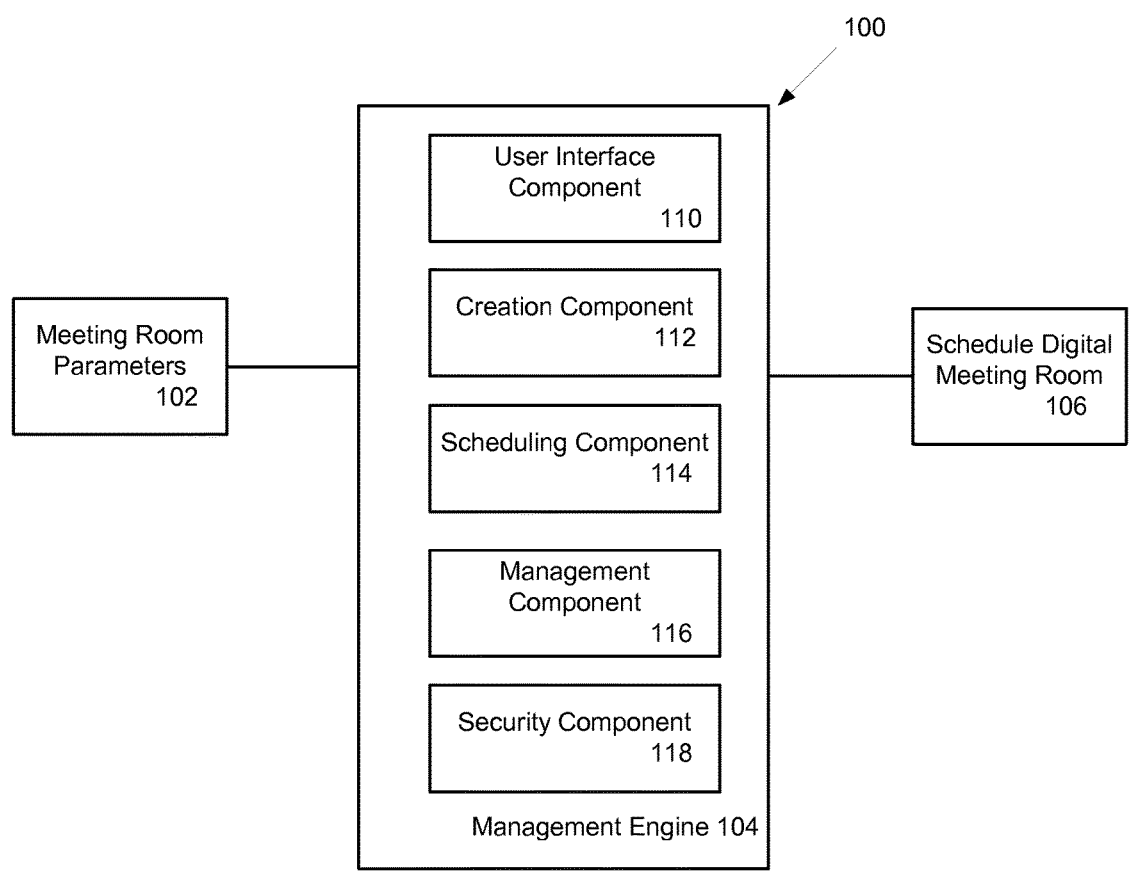
FIG. 1 is a block diagram of a system for managing digital emulations and physical resources, according to one embodiment.

Stated broadly various aspects and embodiments are directed to facilitation and management of digitally emulated resources, which allows users to create their own digital meeting room for the purposes of managing digital and physical resources (e.g., physical displays, physical walls, tables, seats, computer systems, telephones, telephonic systems, digital furnishings, physical meeting rooms, or physical multi-display environments), digital resources (e.g., virtualized physical resources, virtual meeting rooms, virtual displays, digital multi-display environments, hybrid digital scrum boards, user interfaces, data files, or software programs); assigning presentations to displays (e.g., power point presentations, video feeds, video display, audio feeds, audio displays, video conferences, teleconferences, interactive data models/representations, or software programs); authorizing people to access the meeting room (e.g., physical and digital access control for personnel and/or content); scheduling a meeting within the meeting room; locking out the meeting room (e.g., physical and digital locks) from others who are not authorized; conducting meetings within the digital room; and associating the digital room to a physical room and/or resources reserving both for a presentation meeting.

According to some embodiments, special physical meeting rooms can be configured to be managed by digital emulations generated on a management system. In one example, the digital meeting room is configured to emulate special analytical physical rooms which have multiple displays and multiple physical resources that the digital rooms mirror. The digital rooms are used to establish analytical presentations, for example, for future use with a physical room, where security is paramount. In some examples, data scientists set up the digital rooms and can manage security of the room dynamically, and can even control security based on the content being displayed.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 is a block diagram of an example system 100 for managing resources and digital emulations of physical resources, according to one embodiment. The system 100 can be configured to create digital meeting rooms associated with physical resources. The system 100 can manage presentations, people, time periods, priorities, and/or purposes for any meeting. In some examples, the single source point of management provided by the digital meeting room eliminates the confusion and conflicts that conventional systems generate. Further, security in both the digital resources and the physical resources can be monitored and managed using the digital meeting room. In some examples, the system enables specification of authorized users, and even authorized content, such that as scheduled presentations are underway, changes in content during the presentation trigger security functions (e.g., pause or stop display, notify of "unauthorized" personnel, etc.), security responses can be limited to the violating location, and even limited to a single display screen and respective content (e.g., allowing a meeting to proceed on the managed resource while the security issue is resolved), among other options.

In some embodiments, system 100 can include a management engine 104 configured to manage creation or modification of digital meeting rooms and definition of associations with physical and/or digital resources. For example, users can access system 100 and/or engine 104 to input parameters for defining a digital meeting room (e.g., 102) or select an already created meeting room. Once a digital meeting room is created or selected, the user can schedule the room (and all of its associated resources), queue content for display during the meeting, and/or assign the content to any one or more of the resources (e.g., HD display screen in location A, HD display screen in location B, video conference system of location C, a plurality of display screens in location D, etc.) of the digital meeting room. In some examples, the system 100 and/or engine 104 is configured to enable user(s) to define security constraints for the meeting. For example, the user can define permitted participants allowed to be present for the meeting. In another example, the user can define content based permission(s), such that the content will only be displayed during the meeting if each person present in a physical location associated with the digital meeting room is allowed to view the content. Additionally, the system can monitor digital presences in the digital meeting room, and restrict content presentation accordingly.

According to some embodiments, the system 100 and/or engine 104 can instantiate a plurality of system components configured to perform specialized functions associated with the management system. Alternatively, the system and/or engine 104 can perform any of the functions, operations, or processes discussed herein without need for specialized components.

According to one embodiment, the system and/or engine is configured to instantiate a creation component 112. The creation component 112 can be configured to manage creation of digital meeting rooms. In some embodiments, creation of the digital meeting room can include association of physical or digital resources with the digital meeting room. For example, the creation component 112 can present multiple physical locations and respective physical resources that are contained in the physical locations to the user, for example through a user interface (e.g., created by user interface component ("UI") 110). The user can select physical locations (e.g., physical meeting rooms) in multiple locations and bundle the locations and respective resources into the digital meeting room. The digital meeting room can be generated as a centralized management tool for a plurality of physical meeting rooms spanning multiple geographies and even national boundaries. In one example, a multinational corporation can have globally distributed physical resources that can be managed by the digital room.

In further embodiments, the user interface generated by the UI component 110 can be configured to present displays of physical and/or digital resources, which can be dragged and dropped into the digital meeting room container. Responsive to drag and drop operations or other selection, the system can automatically create the associations between the digital room and the resources (e.g., meeting room, displays, etc). According to one embodiment, the system can present an inventory of physical resources (e.g., smart boards, webcams, HD displays, etc.) that are associated with the digital room responsive to selection of the physical room in which they are located. In further examples, the system can request confirmation of resources associated with the physical room before associating the physical resources to the digital room.

In other embodiments, the creation component 112 is configured to build digital meeting rooms from existing specifications. For example, users can merge existing digital rooms and add additional digital rooms and/or physical rooms into an association or reservation. In one embodiment, the system, engine, and/or creation component 112 is configured to include and identify which physical resources (e.g., displays) are being allocated to the digital room. Further, the system enables users to specify specific content (e.g., presentation) to respective displays within the meeting room. For example, when the room owner (e.g., data scientist) creates the digital room (e.g., by merging existing rooms), the data scientist may schedule the associated resources, and assign content and/or queue content to the various displays in the associated physical rooms.

In other embodiments, the creation component 112 can support copy and modify operations on existing digital rooms. Although the underlying physical rooms are static and must be available for use, digital rooms may be copied and modified while the room is in use or reserved for use. In some examples, the system includes functionality to enable the current meeting participants to override subsequent meetings using the same resources. As discussed, new rooms created by copying another digital room may now be associated with a physical room at another time and associated with other people. The system can be configured to limit copying of digital rooms to users having authority over the initial room being copied.

In one example, displays of buildings and, for example, physical meeting rooms can be shown in a UI. The various rooms can be selected and incorporated into a digital meeting room container based on operations performed by a user within the user interface. The display of the digital meeting room container can include displays of each physical resource added into the digital meeting room. In one example, users can select each physical resource and identify content for display on that resource during a scheduled meeting.

According to one embodiment, the system and/or engine can include a scheduling component 114 configured to manage scheduling of the digital meeting rooms and associated resources. In some embodiments, the scheduling component 114 can prevent users from adding resources that are already committed or reserved. In other embodiments, the system can permit creation of the digital room with the associated resources, and provide information regarding when the aggregation of the resources is available for use.

In one example, the scheduling component 114 is configured to enable users to reserve digital rooms. Once a room is established, those who are authorized (e.g., room creator or another user given management control by the room creator) would be allowed to reserve the digital and physical rooms for a presentation. The scheduling component 114 can accept specification of date and time, and control aggregation of resources into the digital room. In another example, the scheduling component 114 can analyze the resources added to determined when they are all available. Once a room is scheduled only those with authority may override the schedule, and the system can prevent other users from schedule those resources for that time.

For example, data scientists are provided tools to schedule and automatically launch a particular analysis session on a specified resource (e.g., a display screen) in a particular room for a particular audience (e.g., at 4:15 on Yellow monitor for user 1, user 2, and user 3). In further examples, content can be queued to physical resources, wherein the system is configured to show a presentation dashboard for specified users (e.g., user 1, user 2, and user 3) on selected resources (e.g., monitor 1). The specification can include additional presentations and actions to be performed during a meeting (e.g., switch to presentation 2 at 4:30 for the users making up the sale team, which can be, for example, different or the same as the first specification of users (e.g., user 1, user 2, and user 3)).

The scheduling component 114 can be configured to manage scheduling of digital and physical usage. This allows users of the system to know, unambiguously, if either a digital or physical room was in use or when it will be in use to ensure they do not disrupt a meeting or a presentation. For example, users would be able to realize that meeting is in progress—in some examples the digital rooms and meeting specification are configured to provide information on the purpose of the meeting so that disallowed users understand why they are not allowed in the room (i.e. executive meeting in progress, please do not disturb).

In some embodiments, the scheduling component 114 is configured to provide scheduling of shared resources and/or shared digital rooms. In one example, a digital room creator can specify that the digital room is a shared resource. In another example, the room creator can specify that resources within a digital room can be shared. As long as the shared resource is available (i.e., not scheduled) any user can schedule use of the shared resource. The scheduling component 114 can be further configured (e.g., by a user within a user interface) to permit partial room scheduling. As digital rooms can be the aggregation of many physical spaces and/or resources, the system, engine, and/or scheduling component can be configured to allow reservation of portions of digital rooms.

According to some embodiments, because the digital and physical rooms have multiple displays or resources, users may only want to schedule part of the room allowing others to work in the room at the same time. If a room is partially scheduled, the system enables other users to schedule unreserved sections of the room. For example, equipment in the room may be individually scheduled (e.g., smart board, web cams, and displays, among other options) and any remaining resources are left available for further scheduling, for example, by other users.

Once scheduled, the system can execute any scheduled meetings, displays, broadcasts, transmissions, etc. In one embodiment, the system includes a management component 116 configured to manage the content being displayed according to any schedule. In one example, the management component 116 can control dynamic start up of digital and physical room resources and any content scheduled to be presented, for example, via the reservation of the digital meeting room. The management component 116 can dynamically start a presentation at the designated date and time of the reservation.

Furthermore, in various embodiments, the management component 116 can control dynamic changes or updates to the originally configured physical and/or digital resources and content. For example, specific content allocated to respective displays represented in the digital room and/or within a physical meeting room having a multi-display environment can be updated, changed, interrogated, or otherwise altered by the management component 116 in response to user input. Such user input can be provided by, for example, meeting participants or room owners in response to questions or topical discussions that arise during a meeting. Similarly, if a scheduled meeting extends beyond a scheduled end time, the management component 116 can transfer the respective resources represented in the digital room to alternate physical resources/locations such as one or more alternate physical meeting rooms or one or more meeting participant's mobile devices.

In various embodiments, management component 116 can include a user interface for configuring physical, digital, financial, and human resources and related specific content. For example, the user interface can be displayed as a hybrid digital scrum board having a plurality of interactive user interface elements associated with or positioned within one or more status regions. In accordance with various embodiments, each of the status regions and/or interactive user interface elements can be associated with any one or more of physical, digital, financial, and human resources in order to provide dynamic user control over the digital room and associated resources. By, for example, moving one or more of the interactive user interface elements from a first status region to a second status region, the user can use the hybrid digital scrum board of the management component 116 to control the system, thereby making dynamic changes or updates to the originally configured physical and/or digital resources and content prior to, during, or after the meeting as discussed hereinabove.

According to other embodiments, the management component 116 can be configured to manage meeting alerts as well. For example, the system can be configured to alert those in the room that a reserved/scheduled meeting is about to begin via the displays in the room. This will give those in the room the ability to override the next presentation—if they have the authority to do so. For example, the system would indicate on the screen "Please be advised: next meeting (e.g., Doug's Staff meeting) begins in 5 minutes." The system can also be configured to notify those who are planning on using the room of any override. Screen alerts allows current users to see the schedule so they can set up their next meeting and/or conclude a current meeting in favor of the next. The management component can also deliver status messages regarding the meeting, for example, outside each physical room associated with the digital room. In one example, status messages are shown on displays external to each of the physical rooms. The display can indicate that a meeting is in progress and that those using the room should not be disturbed.

The system can also include a security component 118. According to one embodiment, the security component 118 can be configured to monitor digital meeting rooms to determine what users, meeting participants, and other users are present and/or viewing the digital meeting rooms. The security component 118 can be configured to enforce access lists and/or meeting participation lists. For example, the security component can enforce specification of invited participants, preventing other users from accessing physical rooms (e.g., badge access denied for non-invited participants). In one example, the security component can monitor rooms for personnel based on RFID identifiers issued to personnel. The security component 118 can compare participant lists against the persons present, and either allow the meeting to take place if everyone is allowed, or prevent the meeting from starting if not. According to one embodiment, the security component 118 can monitor content displayed in a digital meeting rooms and enforce security based the displayed content. For example, users may specify access lists for specific content displays. As the meeting progresses and a new presentation is scheduled to start, for example, the security component 118 can prevent the display of the new content. In another example, the security component can monitor digital access as well as physical presence and prevent unauthorized access (e.g., log unauthorized users out of digital resources or blank digital displays, etc.).

Monitoring by the security component 118 can include alerting those in the room. For example, if the physical room's doors are ajar the participant can receive a notification. If sensitive information is being displayed the screens can be blank or shutdown. According to one embodiment, the system can analyze the content being displayed to determine that the presentation has been identified or marked "confidential." In one example, when a door opens, display screens temporarily go black until the door closes. Once closed the visuals return (providing that the person that entered is allowed to see it). Displayed content can be marked confidential on the system. For example, users can identify which digital rooms are confidential and associate only those users who should be able to use the room. In another example, data scientists would be able to lock digital and physical doors based on a meeting in progress, or the content showing on the screen.

In further embodiments, the system can provide dynamic room security. Dynamic room security can include the ability to secure the room, who can see what content (e.g., user role can be identified and/or associated with viewing privileges), who can enter a meeting and when (e.g., access can be assigned dynamically), and coordinate what is shown based on who has arrived, and/or left a meeting (e.g., physical and digital monitoring of presence). The system can monitor any digital rooms to established who is "in" the room (e.g., physical and digital access points) for each connected room at all times. For example, a security component (e.g., 118) can ensure that what is being shown is secure, both for the room and for the people authorized to see content displayed in the room. If, for example, someone accesses a virtual component of the meeting room without proper clearance, the virtual screens go blank. The system can separately control the physical resources and allow the meeting to continue on the physical screens. If someone walks into one of the physical rooms not cleared to see what is on a particular screen that screen goes blank.

As discussed, the management system can include a variety of components and/or execute the functions discussed without the specific components. According to one embodiment, the system and/or engine 104 can be implemented on a computer system (e.g., general purpose computer system 600 and/or 602 of FIG. 6) specially configured to execute the functions and/or operations discussed herein. In further embodiments, the management system can be configured to integrate into a variety of environments and work with a variety of existing systems (e.g., conventional scheduling, calendaring, and resource management systems).

Figure 2:
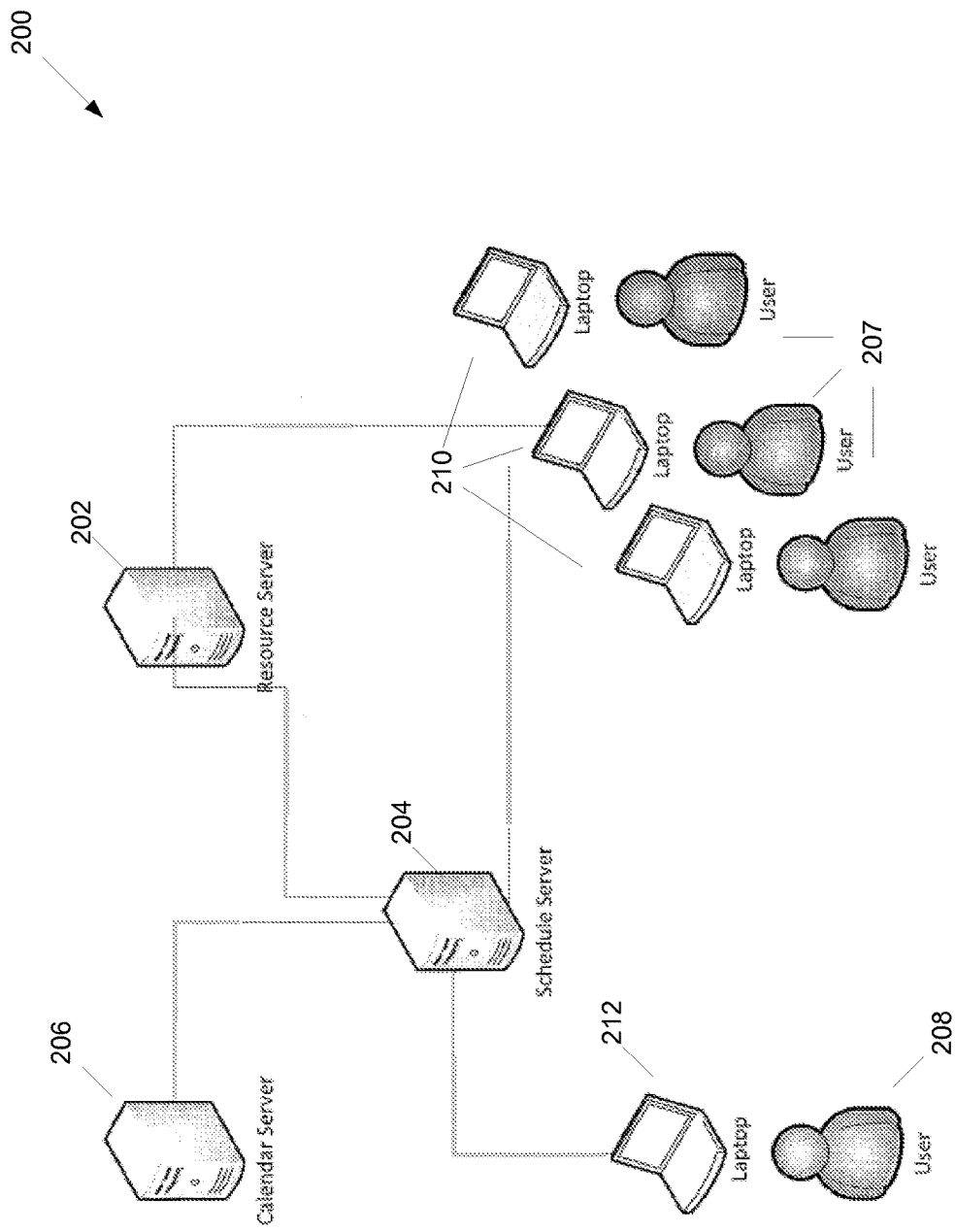
FIG. 2 is a block diagram of a management environment for managing digital emulations and physical resources, according to one embodiment.

FIG. 2 is a block diagram of an example environment/architecture 200 for a management system (e.g., 100) according to one embodiment. As shown, the system can include a number of servers (e.g., 202, 204, and 206) accessible to end users (e.g., 207 and 208) who access the servers from respective computer systems (e.g., laptops 210 and 212 or other computing devices (e.g., smart phones, tablets, etc.)). In some embodiments, the servers (e.g., 202, 204, and 206) can be allocated specific functions to perform as part of creating, managing, and/or scheduling digitally emulated resources. Further, the servers can be configured to integrate with existing inventory and/or scheduling systems to take advantage of existing systems and/or functionality. In one example, a calendar server 206 can be configured to integrate with existing calendaring systems (e.g., Microsoft Exchange or other calendaring program) to enable capture of existing scheduling information. Any existing scheduling information can be presented to end-users by a schedule server (e.g., 204). The scheduling server can also be configured to manage information on authorized/un-authorized users and their availability. The calendar server and schedule server can both be configured to communicate with a resource server, which is responsible for the individual resources of, for example, physical meeting rooms. In some embodiments, users (e.g., 207 and 208) access resources through the resource server based on schedule of availability managed by the schedule server (e.g., 204). In other embodiments, the servers (e.g., 202-206) co-ordinate creation, management, and/or scheduling of digital rooms and their associated physical resources. Further, end users (e.g., 207 and 208) who access the servers from respective computer systems (e.g., laptops 210 and 212 or other computing devices (e.g., smart phones, tablets, etc.)) can, in accordance with various embodiments, interactively access the digital room and associated representations of physical and digital resources for participation in the meeting. Still further, the servers can be configured to provide security operations and/or provide for scheduling or content displays.

Figure 3:
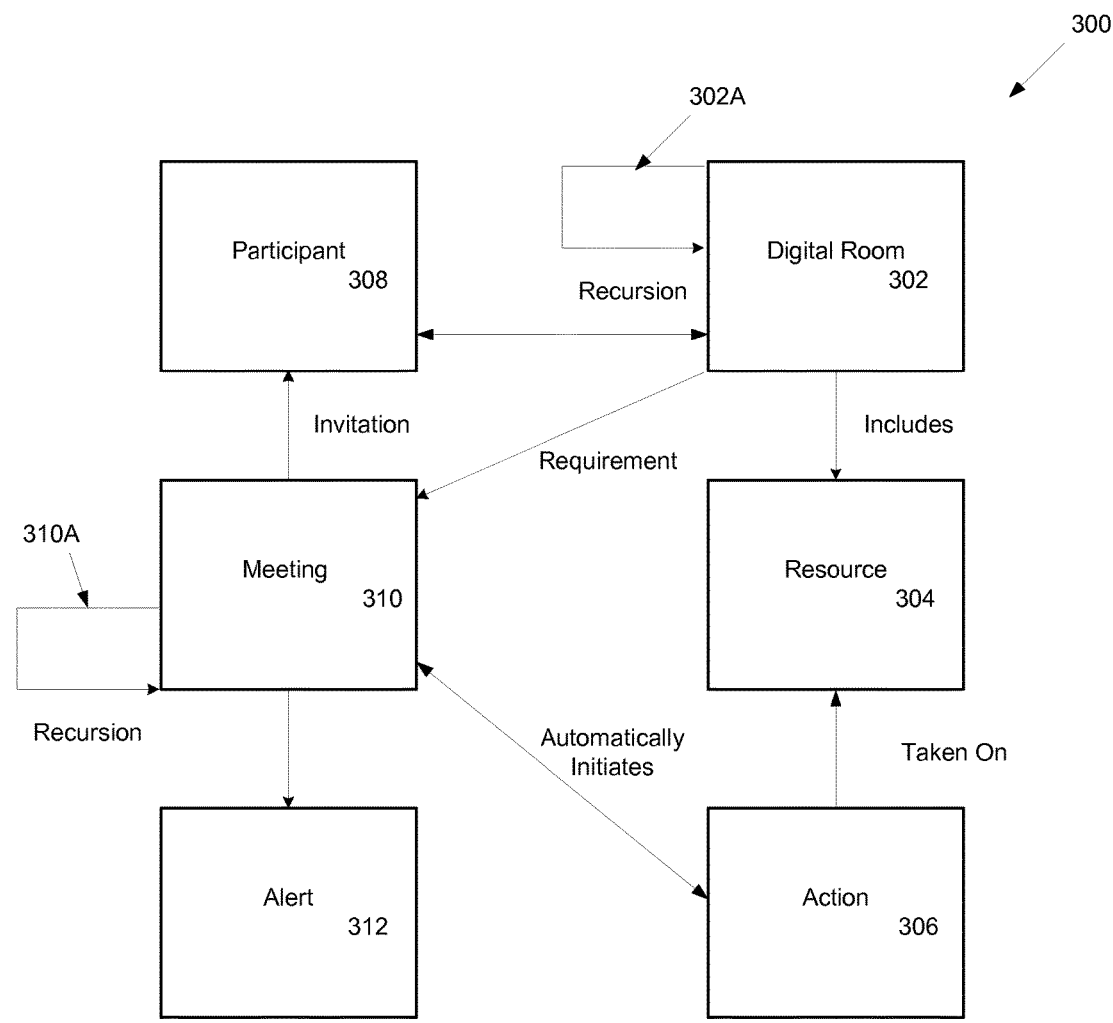
FIG. 3 is a block diagram of a management flow for managing a digital room and resources, according to one embodiment.

FIG. 3 shows an example logical diagram showing properties and operations that can be executed/provided by a management system (e.g., 100) or executed within a management system environment (e.g., 200). Process 300 begins with selection or definition of a digital room at 302. At 302A, shown is the ability to merge various digital rooms and/or add resources to a digital room. The meeting location(s) may be physical or digital and can be connected to other rooms. In one example, invited and/or unauthorized individuals are tracked within the room via secure methods such as user-id or badge access. At 304, each digital room can be configured with multiple resources such as monitors, computers, etc. The resources within each room can be managed by the system to take on or launch automatically specified functions and/or content displays based on scheduling of that resource (e.g., at 306).

At 308, individuals are invited to attend a meeting. Meetings may require multiple participants, where attendees are tracked, for example, via log upon entry into the digital rooms (e.g., whether by physical access to a physical room or by logging into a digital resource). For example, at 310 a meeting is scheduled to occur at a particular time and place and individuals are invited to attend (e.g., 308). Individuals can be added recursively (e.g., 310A). Prior to, or during a meeting, alert(s) can be initiated (e.g., 312) to notify the attendees of an upcoming action (e.g., 306), such as meeting start, meeting end, to prepare the participants for pending activities, notify users of an actionable event requiring responsive collaboration, etc.

Figure 4:
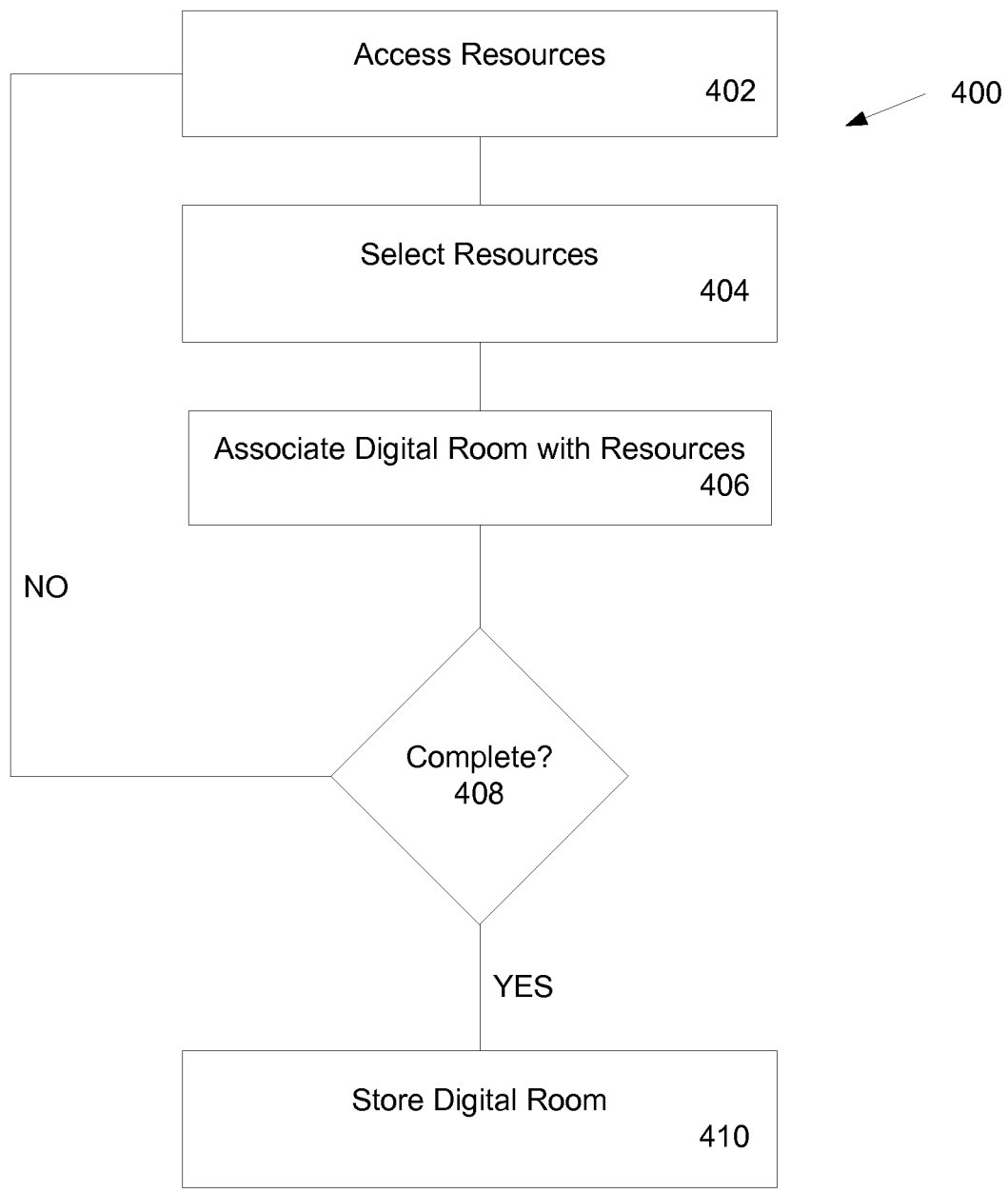
FIG. 4 is an example process flow for creating a digital room, according to one embodiment.

The logical operations discussed in FIG. 3 can be executed as separate processes for example, by a management system. In one example, the system can execute one or more processes for creating, defining, and/or managing digital rooms. FIG. 4 shows an example process 400 for creating a digital meeting room according to one embodiment. Process 400 beings at 402 with accessing one or more resources to incorporate into a digital room. In some examples, step 402 can be executed in conjunction with a visual display of buildings, meeting rooms, physical resources, digital resources, etc. In one example, a user can build elements of the digital room in a UI display by accessing the visual display and selecting a resource (e.g., at 404). Once selected, the resource can be associated with the digital room at 406. If additional resources are desired (e.g., 408 NO), additional resources can be accessed at 402, selected at 404, and associated with the digital room at 406. Processing at 402-406 can occur as individual selections of resource(s), or can proceed, in other alternatives, as selections of multiple resources (e.g., physical meetings rooms, physical resources, digital resources, etc.) added to a digital room. Once all the resources desired are selected and associated (e.g., 408 YES), the digital room can be saved at 410.

In some embodiments, once a digital room has been built from selected resources, additional specification of meeting parameters can be entered. For example, the room creator can identify participants for a meeting to occur in the digital rooms. Depending on the participants, and their respective locations, a management system can specify what resources the respective participants will be presented for accepting a meeting request. In one alternative, invited participants can select and/or specify what resource the participant wishes to use in order to attend the meeting.

Meeting organizers can also use the defined room to schedule content displays on resources within the digital rooms and specify who can view the content. In some examples, each resource can be scheduled for a specific content display having a respective start and/or end time. In other embodiments, multiple resources within the digital room can be selected together to identify what content will be displayed on the resource, at what time, and/or who can view the content that is to be displayed. In other embodiments, content can be generically specified as confidential or privileged, and only users having user roles that permit access to the specified level will be allowed to view the content. In accordance with various embodiments, the system can dynamically update the digital room and the associated specific content, content/resource scheduling, security parameters, or other room features at any time prior to, during, or after the meeting. Such updates can be driven by user input from the room owner, meeting participants, or other authorized parties.

Figure 5:
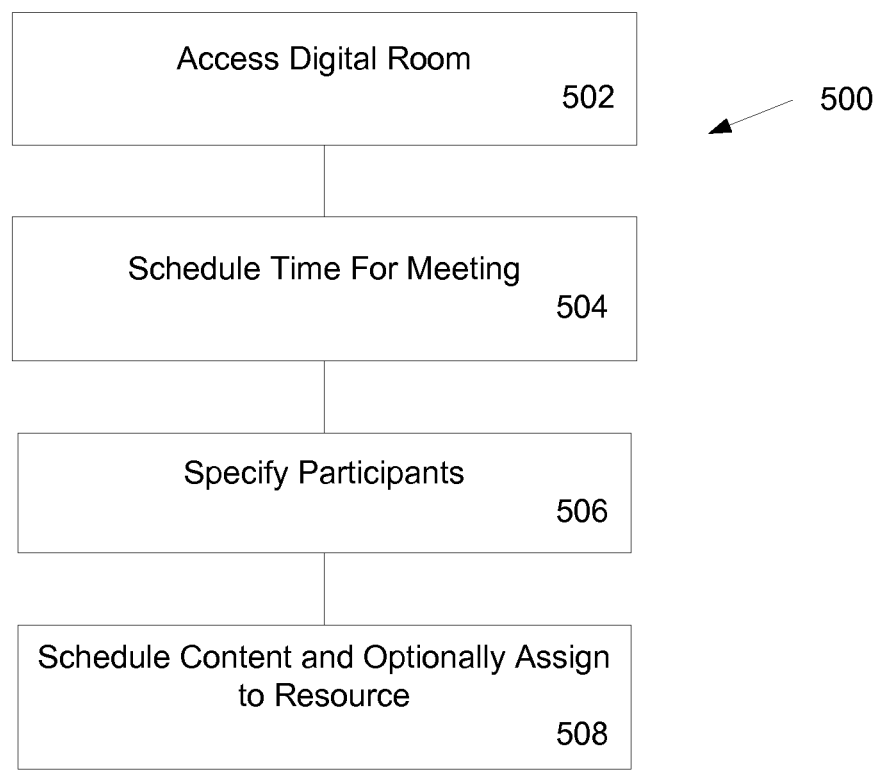
FIG. 5 is an example process flow for scheduling a digital room, according to one embodiment.

According to some embodiments, access rights and authorization to attend meetings can be specified as part of scheduling a meeting. FIG. 5 shows an example process 500 for scheduling digitally emulated resource using a digital meeting room. Process 500 begins at 502 with accessing a digital room. The digital room can define a management tool for coordinating management of a variety of physical and digital resources. Each digital room can be associated with digital and physical resources at its creations. As needed, digital rooms can be modified, for example, by the room creator or by users given authority to modify the digital room. In one example, additional physical resource(s) (e.g., a new meeting room and display monitors installed in the new meeting room) can be added to the digital meeting room.

Once the desired digital meeting room has been identified and accessed at 502, a meeting time using the resources represented by the digital room can be scheduled. For example, a user can schedule a meeting time at 504 using a selected digital room. According to some embodiments, the user may be prevented from selecting times during which the digital room has occupied resources. In one alternative, the user can schedule portions of a digital room, thus, so long as all the resources have not been scheduled, the user can access the digital room and a desired time.

Typically, scheduling conflicts can occur across resources and personnel. According to one embodiment, specification of participants for a given meeting can be used to filter times for meetings, for example, at 504. According to one embodiment, scheduling the meeting time at 504 and specifying participants at 506 occurs as separate steps, however, in other embodiments, 504 and 506 can be combined, and/or executed in different order. In some embodiments, the definition of participants can be used to filter available times of the digital rooms and associated resources. For example, scheduling conflicts between the participants may limit timing for a proposed meeting. Optionally, meeting times can be determined and proposed in response to the input of participants, selection of the digital room, and/or selection of specific resources in a digital room.

Once the participants have been selected and the digital room has been scheduled, process 500 can continue with scheduling on content for the meeting at 508. Optionally, content can be scheduled for the meeting and assigned to specific resource(s) within the digital room. In one example, a user can select specific displays that are being managed through the digital room. The user can associate specific content (e.g., power point) for display on those screens. In further examples, the user can specify timing for the content (e.g., start, stop, run-time, etc.) as part of the scheduling. In some embodiments, implicit in selecting participants is the intent to allow those participants to view any content scheduled for the meeting. In other embodiments, each participant can be analyzed to determine that they are authorized to view any scheduled content. In the event of conflict, the meeting organizer can grant authorization or received a notification that the included user does not have sufficient authorization to view scheduled content.

In further embodiments, the meeting organizer can specify the content to be shown and any access restrictions to the content as part of scheduling a meeting. In yet other embodiments, the meeting organizer can specify multiple content sources, and access restrictions/permission for each content source as part of scheduling the meeting.

According to some implementations, content access restrictions can be specified separately from meeting scheduling (e.g., an access level can be specified at the creation of content). As part of the meeting creation, specified content can be analyzed and access restrictions and participant(s) evaluated for their respective access levels (e.g., confidential, high security, etc.). In some embodiments, other processes can monitor ongoing meetings to ensure compliance with access restriction and/or to maintain digital or physical security during any meeting time.

Various system component and/or process can be executed as part of creating, managing, and employing digital emulated resources. For example, various aspects and functions described herein may be implemented as hardware, software, or a combination of hardware and software on one or more computer systems. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among one or more computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system components using a variety of hardware and software configurations, and the implementation is not limited to any particular distributed architecture, network, or communication protocol. Furthermore, digital emulation functions, digital room creation, participant scheduling, content scheduling, and resource scheduling, among other options may be implemented as specially-programmed hardware and/or software.

Figure 6:
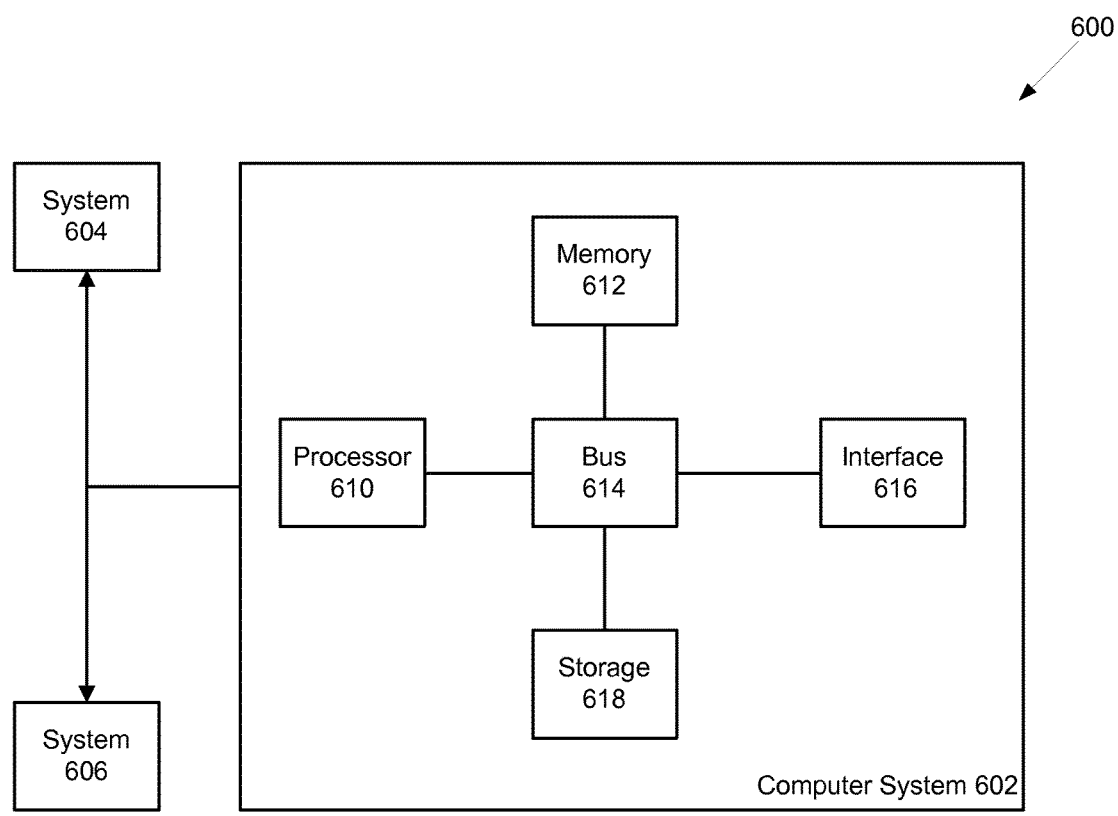
FIG. 6 is a block diagram of an exemplary computer system that may be specially configured to perform processes and functions disclosed herein.

FIG. 6 shows a block diagram of a distributed computer system 600, in which various aspects and functions in accord with the present invention may be practiced. The distributed computer system 600 may include one more computer systems that can be specially configured to perform the functions, operations, and/or processes disclosed herein (e.g., digital room creation, digital room scheduling, security monitoring, content access control, etc.). For example, as illustrated, the distributed computer system 600 includes three computer systems 602, 604 and 606. As shown, the computer systems 602, 604 and 606 are interconnected by, and may exchange data through, a communication network 608. The network 608 may include any communication network through which computer systems may exchange data. To exchange data via the network 608, the computer systems 602, 604, and 606 and the network 608 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA HOP, RMI, DCOM and Web Services.

Computer systems 602, 604 and 606 may include mobile devices such as cellular telephones. The communication network may further employ one or more mobile access technologies including 2nd (2G), 3rd (3G), 4th (4G or LTE) generation radio access for cellular systems, WLAN, Wireless Router (WR) mesh, and other communication technologies. Access technologies such as 2G, 3G, 4G and LTE and future access networks may enable wide area coverage for mobile devices. For example, the network may enable a radio connection through a radio network access such as Global System for Mobil communication (GSM), General Packet Radio Services (GPRS), Enhanced Data GSM Environment (EDGE), Wideband Code Division Multiple Access (WCDMA), among other communication standards. The communication network may include any wireless communication mechanism by which information may travel between the devices 604 and other computing devices in the network.

To ensure data transfer is secure, the computer systems 602, 604 and 606 may transmit data via the network 608 using a variety of security measures including TSL, SSL or VPN, among other security techniques. While the distributed computer system 600 illustrates three networked computer systems, the distributed computer system 600 may include any number of computer systems, networked using any medium and communication protocol.

Various aspects and functions in accord with the present invention may be implemented as specialized hardware or software executing in one or more computer systems including the computer system 602 shown in FIG. 6. As depicted, the computer system 602 includes a processor 610, a memory 612, a bus 614, an interface 616 and a storage system 618. The processor 610, which may include one or more microprocessors or other types of controllers, can perform a series of instructions that manipulate data. The processor 610 may be a well-known, commercially available processor such as an Intel Pentium, Intel Atom, ARM Processor, Motorola PowerPC, SGI MIPS, Sun UltraSPARC, or Hewlett-Packard PA-RISC processor, or may be any other type of processor or controller as many other processors and controllers are available. As shown, the processor 610 is connected to other system placements, including a memory 612, by the bus 614.

The memory 612 may be used for storing programs and data during operation of the computer system 602. Thus, the memory 612 may be a relatively high performance, volatile, random access memory such as a dynamic random access memory (DRAM) or static memory (SRAM). However, the memory 612 may include any device for storing data, such as a disk drive or other non-volatile storage device, such as flash memory or phase-change memory (PCM). Various embodiments in accord with the present invention can organize the memory 612 into particularized and, in some cases, unique structures to perform the aspects and functions disclosed herein.

Components of the computer system 602 may be coupled by an interconnection element such as the bus 614. The bus 614 may include one or more physical busses (for example, busses between components that are integrated within a same machine), and may include any communication coupling between system placements including specialized or standard computing bus technologies such as IDE, SCSI, PCI and InfiniBand. Thus, the bus 614 enables communications (for example, data and instructions) to be exchanged between system components of the computer system 602.

Computer system 602 also includes one or more interfaces 616 such as input devices, output devices and combination input/output devices. The interface devices 616 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 616 allow the computer system 602 to exchange information and communicate with external entities, such as users and other systems.

Storage system 618 may include a computer-readable and computer-writeable nonvolatile storage medium in which instructions are stored that define a program to be executed by the processor. The storage system 618 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 610 or some other controller may cause data to be read from the nonvolatile recording medium into another memory, such as the memory 612, that allows for faster access to the information by the processor 610 than does the storage medium included in the storage system 618. The memory may be located in the storage system 618 or in the memory 612. The processor 610 may manipulate the data within the memory 612, and then copy the data to the medium associated with the storage system 618 after processing is completed. A variety of components may manage data movement between the medium and the memory 612, and the invention is not limited thereto.

Further, the invention is not limited to a particular memory system or storage system. Although the computer system 602 is shown by way of example as one type of computer system upon which various aspects and functions in accord with the present invention may be practiced, aspects of the invention are not limited to being implemented on the computer system, shown in FIG. 6. Various aspects and functions in accord with the present invention may be practiced on one or more computers having different architectures or components than that shown in FIG. 6. For instance, the computer system 602 may include specially-programmed, special-purpose hardware, such as for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

The computer system 602 may include an operating system that manages at least a portion of the hardware placements included in computer system 602. A processor or controller, such as processor 610, may execute an operating system which may be, among others, a Windows-based operating system (for example, Windows 7 or Windows 8) available from the Microsoft Corporation, a MAC OS System X operating system available from Apple Computer, one of many Linux-based operating system distributions (for example, the Enterprise Linux operating system available from Red Hat Inc.), or UNIX-type operating systems available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, functions in accord with aspects of the present invention may be implemented using an object-oriented programming language, such as SmallTalk, JAVA, C++, Ada, or C# (C-Sharp). Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for managing emulations of digital and physical conference resources; the system comprising:
    at least one display within at least one physical meeting room;
    at least one processor operatively connected to a memory;
    the processor executes a creation component to create a digital room accessible via a communication network, wherein the digital room emulates physical properties of the at least one physical meeting room including the at least one display within the at least one physical meeting room;
    the processor executes a scheduling component to schedule and to manage invitations for access to the digital room and the at least one physical meeting room;
    the processor executes a management component to manage operation of, and allocate content to, the at least one display represented in the digital room and the at least one display within the at least one physical meeting room; and
    the processor executes a security component to monitor properties associated with the at least one physical meeting room and the digital room for compliance with at least one security rule, and
    prevent unauthorized users from accessing the physical meeting room and the digital room,
    wherein the system separately control the physical meeting room and the digital room,
    wherein the processor modifies the digital room to emulate physical resources within the at least one physical meeting room or additional physical meeting rooms,
    wherein the processor accesses an inventory of resources associated with the at least one physical meeting room or the additional physical meeting rooms and associate the digital meeting room with physical resources specified in the inventory of resources,
    wherein the processor associates the physical resources with the digital meeting room responsive to user selection.

2. The system according to claim 1, wherein the processor manages scheduling of participants, physical, and digital resources.

3. The system according to claim 1, wherein the processor schedules respective ones of the at least one display within the at least one physical meeting room for presenting digital content.

4. The system according to claim 3, wherein the processor manages operation of the at least one display based at least in part on scheduling of content to be displayed on the respective ones of the at least one display.

5. The system according to claim 3, wherein the processor analyzes the scheduled digital content for access restriction and determine compliance with the access restrictions based, at least in part on the properties.

6. The system according to claim 5, wherein the properties include information on participants present in the digital and the at least one physical meeting room and access permissions associated with the participants.

7. The system according to claim 5, wherein the processor prevents display of the scheduled content responsive to violation of an access restriction.

8. The system according to claim 5, wherein the processor prevents display of the scheduled content responsive any one of an open door in an associated meeting room, unauthorized person, or unidentified person having access.

9. A computer implemented method for managing emulations of digital and physical conference resources, the method comprising:
    displaying, at least one display, within at least one physical meeting room;
    creating, by a computer system, a digital room accessible via a communication network, wherein the digital room emulates physical properties of the at least one physical meeting room including the at least one display within the at least one physical meeting room;
    scheduling, by the computer system, invitations for access to the digital room and the at least one physical meeting room;
    managing, by the computer system, operation of, and allocate content to, the at least one display represented in the digital room and the at least one display within the at least one physical meeting room; and
    monitoring, by the computer system, properties associated with the at least one physical meeting room and the digital room for compliance with at least one security rule; and
    preventing, by the computer system, unauthorized users from accessing the physical meeting room and the digital room,
    wherein the computer system separately control the physical meeting room and the digital room,
    wherein accessing, by the computer system, the digital room to emulate physical resources within the at least one physical meeting room or additional physical meeting rooms;
    wherein accessing, by the computer system an inventory of resources associated with the at least one physical meeting room or the additional physical meeting rooms; and associating, by the computer system, the digital meeting room with physical resources specified in the inventory of resources;
    wherein the act of associating the physical resources with the digital meeting room is responsive to user selection of the physical resources.

10. The method according to claim 9, wherein scheduling includes managing coordination of participants, physical, and digital resources scheduling.

11. The method according to claim 9, wherein scheduling includes scheduling respective ones of the at least one display within the at least one physical meeting room for presenting digital content.

12. The method according to claim 11, wherein the act of managing includes managing operation of the at least one display based at least in part on scheduling of content to be displayed on the respective ones of the at least one display.

13. The method according to claim 11, further comprising:
    analyzing, by the computer system, the scheduled digital content for access restriction; and
    determining, by the computer system, compliance with the access restrictions based, at least in part on the properties.

14. The method according to claim 13, wherein the properties include information on participants present in the digital and the at least one physical meeting room and access permissions associated with the participants.

15. The method according to claim 13, further comprising preventing, by the computer system, display of the scheduled content responsive to violation of an access restriction.

16. The method according to claim 13, further comprising preventing, by the computer system, display of the scheduled content responsive any one of an open door in an associated meeting room, unauthorized person, or unidentified person having access.

\* \* \* \* \*